No. 682,996. Patented Sept. 17, 1901.
J. K. PUMPELLY.
ELECTRODE.
(Application filed Dec. 26, 1900.)
(No Model.)
Fig. 1
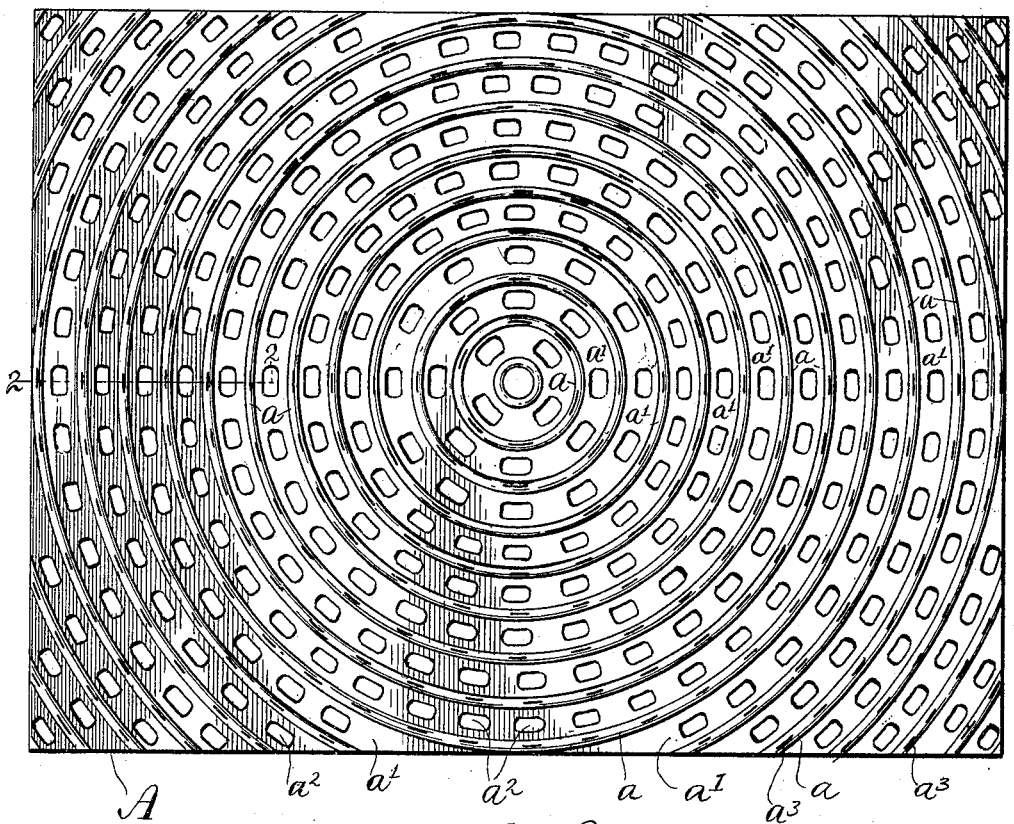
Fig. 2
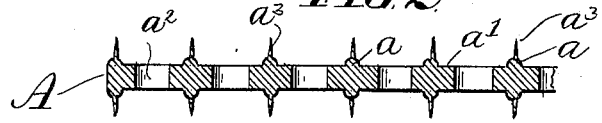
Fig. 3
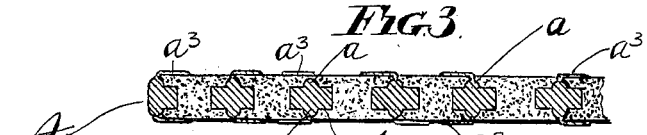
Fig. 4
Fig. 5
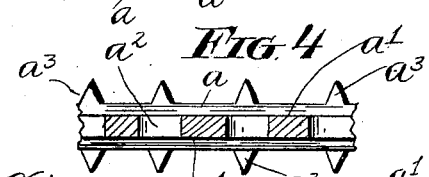
Witnesses:
A. J. Bell.
E. P. Jones
Inventor:
James K. Pumpelly
By Josiah McRoberts
his atty.

UNITED STATES PATENT OFFICE.

JAMES K. PUMPELLY, OF CHICAGO, ILLINOIS.

ELECTRODE.

SPECIFICATION forming part of Letters Patent No. 682,996, dated September 17, 1901.

Application filed December 26, 1900. Serial No. 41,039. (No model.)

*To all whom it may concern:*

Be it known that I, JAMES K. PUMPELLY, of the city of Chicago, in the county of Cook and State of Illinois, have invented certain new and useful Improvements in Electrodes; and I do hereby declare that the following is a full, clear, and exact description of the construction of the same, reference being had to the accompanying drawings, making a part of this specification, and to the letters of reference marked thereon.

My invention relates to electrodes, and is especially adapted for storage-battery plates, the purpose of the invention being to produce a novel and improved device of this character wherein the expansion of the active material shall not distort or warp the plate.

With this end in view the invention consists in providing a plate or center core, preferably perforated, upon the faces of which are cast ridges concentric to each other and preferably circular in outline, whereby a series of channels for the reception of the active material are so formed that any undue expansion of the active material outwardly against its inclosing ridge will tend to tighten or bind the material in the adjacent channel or channels.

The invention further consists in providing a plate with ridges of this character with thin saw edges or with a series of lips or small flanges which normally extend upwardly from the center and from the edges of the ridges and may be turned or bent over to overhang the channels and retain the active material therein.

In the accompanying drawings, Figure 1 is a face view of one side of the plate, showing the formation and the appearance thereof before the active material has been placed in the channels. Fig. 2 is a sectional view of the same on the line 2 2 of Fig. 1. Fig. 3 is a view similar to Fig. 2, but showing the lips or flanges turned down to illustrate the manner of holding the active material in the channels; and Figs. 4 and 5 are detail views showing the relative arrangement of the retaining lips or flanges.

In the drawings the reference-letter A represents a plate of suitable material, such as lead, which constitutes the core or supporting-base of the completed electrode. The plate is provided upon each side with a series of ridges $a$, which are concentric to each other and are preferably circular in outline, thereby forming on each side of the plate a series of annular channels $a'$, which receive the active material and retain the same in place. The ridges are correspondingly located upon each side of the plate, whereby the beds of corresponding channels upon opposite sides are located opposite to each other. Small perforations $a^2$ of any suitable form, but preferably slightly oval in outline, are formed in the beds of the channels, so that each channel upon one side of the plate communicates with its corresponding channel on the opposite side, whereby when the active material is placed in the channels the same will be keyed to the plate in the manner now well understood in the art. Each ridge is provided upon both of its edges with a series of retaining lips or flanges $a^3$, which are cast integral with the flanges and are quite thin, so that the same may be bent to overhang their adjacent channels. These flanges or lips are preferably formed after the fashion of saw-teeth or saw edges, and the preferable arrangement of the two rows of lips which cooperate with the material in any one channel is such that the lips upon one side of the channel when they are turned down to place are opposite to the openings between the lips upon the opposite side of the channel. This staggered arrangement of the lips or flanges is of advantage, as thereby each edge of the active material within any given channel is firmly retained in place, while the greatest possible exposure of the superficial area of the active material is thereby obtained. It is of course understood that the outer ridge will be provided with but a single row or series of loops or flanges, there being no channel upon the outer side of the same. The arrangement of the lips or flanges and the positions which they assume when turned down to place are all clearly shown in Fig. 4 of the drawings. The circular arrangement of the ridges is of importance and greatly tends to strengthen the plate and prevent distortion and warping of the same. The active material within the channels expands outwardly against the ridges, whereby the expansion of the material in one channel has the tendency and effect of binding or compressing the material in the adjacent channel or channels.

Having thus described my invention, what I claim as new, and desire to secure by Letters Patent, is—

1. An electrode having circular ridges providing intermediate annular channels, and a series of lips or flanges integral with the ridges and adapted to overhang the channels.

2. An electrode provided with circular ridges forming circular channels, and lips or flanges on the ridges, the lips upon one side of the channels standing opposite the openings between the lips on the other side.

In testimony whereof I affix my signature in the presence of two subscribing witnesses.

JAMES K. PUMPELLY.

Witnesses:
CLARA A. BLACKWELL,
J. McROBERTS.